US006937358B2

(12) United States Patent
Sullivan et al.

(10) Patent No.: US 6,937,358 B2
(45) Date of Patent: Aug. 30, 2005

(54) PRINTABLE SUBSTRATE HAVING CONTROLLABLE THICKNESS AND METHOD OF MAKING AND USING THE SAME

(75) Inventors: William A. Sullivan, Penfield, NY (US); Michael L. Weiner, Webster, NY (US)

(73) Assignee: Technology Innovations, LLC, West Henrietta, NY (US)

( * ) Notice: Subject to any disclaimer, the term of this patent is extended or adjusted under 35 U.S.C. 154(b) by 196 days.

(21) Appl. No.: 10/010,573

(22) Filed: Nov. 13, 2001

(65) Prior Publication Data

US 2002/0071701 A1 Jun. 13, 2002

Related U.S. Application Data

(63) Continuation-in-part of application No. 09/501,695, filed on Feb. 10, 2000, now Pat. No. 6,480,298.

(51) Int. Cl.[7] .................... G06F 15/00

(52) U.S. Cl. .................... 358/1.18; 358/1.9; 358/296; 399/38; 399/70; 399/408

(58) Field of Search .................... 358/1.18, 1.9, 358/296; 399/38, 70, 408, 281, 283, 284; 428/219, 211; 340/572.7

(56) References Cited

U.S. PATENT DOCUMENTS

| | | | | | |
|---|---|---|---|---|---|
| 3,556,934 | A | | 1/1971 | Meyer | |
| 3,652,281 | A | * | 3/1972 | Bachelder et al. | 430/209 |
| 3,779,951 | A | | 12/1973 | Streu | |
| 3,884,685 | A | | 5/1975 | Green, Jr. et al. | |
| 3,933,547 | A | | 1/1976 | Yoshida et al. | |
| 5,125,996 | A | | 6/1992 | Campbell et al. | |
| 5,222,282 | A | | 6/1993 | Sukonnik | |
| 5,226,989 | A | | 7/1993 | Sukonnik | |
| 5,287,150 | A | * | 2/1994 | Kinoshita et al. | 399/281 |
| 5,854,957 | A | * | 12/1998 | Morikawa | 399/38 |
| 5,887,408 | A | * | 3/1999 | Wagner et al. | 53/411 |
| 5,925,446 | A | * | 7/1999 | Matsuda et al. | 428/219 |
| 5,940,188 | A | | 8/1999 | Kurozasa | |
| 6,054,170 | A | | 4/2000 | Chess | |
| 6,064,838 | A | | 5/2000 | Maruta et al. | |
| 6,100,804 | A | * | 8/2000 | Brady et al. | 340/572.7 |
| 6,480,298 | B1 | * | 11/2002 | Sullivan | 358/1.18 |

FOREIGN PATENT DOCUMENTS

| | | |
|---|---|---|
| EP | 0343794 | 4/1989 |
| GB | 2136027 | 9/1984 |
| WO | WO0017448 | 3/2000 |

* cited by examiner

*Primary Examiner*—Twyler Lamgb
(74) *Attorney, Agent, or Firm*—Basch & Nickerson LLP; Duane C. Basch

(57) ABSTRACT

The present invention is a method and an apparatus for controlling the volume of a printable substrate after an image is created thereon, and more particularly to the production and use of a calenderizeable substrate in which a final thickness may be adjusted. The system employed for the process includes a pair of compression rollers wherein the nip force therebetween may be adjusted.

22 Claims, 4 Drawing Sheets

PRINTABLE SUBSTRATE HAVING CONTROLLABLE THICKNESS AND METHOD OF MAKING AND USING THE SAME

CROSS REFERENCE

This application is a continuation-in-part of the following related application; "IMAGE BEARING SUBSTRATE HAVING INCREASED DENSITY AND METHOD OF FORMING SAME," by William A. Sullivan, application Ser. No. 09/501,695, filed Feb. 10, 2000, now issued as U.S. Pat. No. 6,480,298.

This invention relates generally to a method and an apparatus for controlling the volume of a printable substrate after an image is created thereon, and more particularly to the production and use of a calenderizeable substrate in which a final thickness may be adjusted.

BACKGROUND AND SUMMARY OF THE INVENTION

Books and other bound paper items are a substantial part of many businesses, homes and institutions of learning. These printed materials are generally formed of multiple sheets or layers of paper. Although each sheet may not have a great individual thickness, the cumulative total of these pages requires significant linear shelf space.

Many facilities for retaining these publications have a fixed storage volume. Thus, many materials are either sent off site or destroyed. The destruction of materials presents numerous negative implications. However, even off site storage requires cataloging transport and maintenance of the materials, thereby adding to the overall cost. While publishers of books and other bound paper items recognize the shelf space problem, the publishers are limited to the thickness of paper they can employ. Most printing devices require the paper to have a minimum thickness, resistance to curl and other parameters that permit rapid processing of the paper. Therefore, the paper must have a certain thickness to print and the resulting publication has a corresponding thickness. This results in increased shelf space requirements of the publications. In addition, binding costs go up as the thickness of material to be bound increases.

One solution to this problem is to use thinner paper. However, thinner paper often is either unusable or frequently jams in many copiers and other image printing or transfer equipment. In the 1970s, the Xerox Corporation introduced a paper known as "micro-spheres" that incorporated miniature paper or plastic spheres for the purpose of reducing the overall weight of the paper and thereby a reduction in mailing costs over conventional paper by virtue of its lighter weight. This paper had the normal thickness of copier paper and worked well in copiers and printers without jamming. This paper is no longer used or manufactured today, but the technology exists for making it.

Therefore, there is an ongoing need for a method of manufacturing, using and processing an imaging substrate, wherein the substrate has a reduced thickness after it has been printed and processed.

Heretofore, a number of patents and publications have disclosed the manufacture of such substrates, the relevant portions of which may be briefly summarized as follows:

U.S. Pat. No. 3,293,114 issued Dec. 20, 1966 discloses papers useful in packaging, printing, preparation of containers and the like wherein hollow expanded spherical particles are incorporated into the paper pulp by admixture with the wet pulp prior to deposition on the screen. These papers demonstrate increase stiffness and increase caliper.

U.S. Pat. No. 3,556,934 represents a method of making papers similar to that described in U.S. Pat. No. 3,293,114, mentioned above, with the exception that this patent teaches the incorporation of the microspheres in an unexpanded state to the aqueous suspension and during the drying of the paper subjecting it to temperatures sufficient to cause the particles to expand within the paper sheet.

U.S. Pat. No. 3,779,951 issued Dec. 18, 1973 relates to an improved method for the expansion of expandable microspheres in the presence of water.

U.S. Pat. No. 3,941,634 issued Mar. 2, 1976 discloses a method for the preparation of paper containing plastic particles by forming two-spaced apart dewatered webs of cellulose fibers introducing expandable thermoplastic beads between the dewatered webs pressing the spaced apart partially dewatered webs together and subjecting this product to heat to at least partially dry the fibers and at least expand a portion of the beads.

U.S. Pat. No. 4,133,688 issued Jan. 9, 1979 discloses a photographic paper coated with a polyolefin on both sides wherein in the preparation of the paper, either non-inflated microspheres which are subsequently inflated during the drying of the paper or inflated microspheres are added to the pulp during preparation of the paper.

U.S. Pat. No. 4,268,615 issued May 19, 1981 relates to a method of producing a relief by forming a layer of a pattern on the surface of a sheet made of a material having the property of increasing in volume when heated, the pattern being made of the material having a stronger ability to absorb light than the aforesaid material, and then radiating a strong light uniformly on the entire surface of the sheet to selectively heat the portion of the sheet adjacent the undersurface of the pattern layer whereby the pattern layer is raised from the sheet surface. The sheet is prepared by mixing microcapsules and a binder such as vinyl acetate polymers.

In accordance with the present invention, there is provided a method for reducing a thickness of a compressible substrate bearing an image, the substrate having an initial thickness, comprising: applying a compressive force to the substrate to compress the substrate to a thickness less than the initial thickness, the compressive force selected to preclude the substrate returning to the initial thickness after removal of the compressive force therefrom; and concurrently applying heat to the substrate.

In accordance with another aspect of the present invention, there is provided a method for reducing a thickness of a substrate bearing an image, comprising: forming an image on a substrate, the substrate transformable from an imaging state having a first thickness to a compressed state having a second thickness thinner than the first thickness; and concurrently compressing and heating the imaged substrate to transform the substrate to the compressed state without substantially distorting the image.

In accordance with yet another aspect of the present invention, there is provided an apparatus for producing a compressed substrate having an image thereon, comprising: an imaging station for rendering an image onto the substrate when said substrate is in an uncompressed state; and a compressing station, operatively associated with the imaging station, to receive an uncompressed substrate with an image thereon and to apply a sufficient compressive force to the imaged substrate to reduce a thickness of the substrate and thereby produce a compressed substrate with an image thereon.

In accordance with a further aspect of the present invention, there is provided a method for reducing a thickness of a compressible substrate bearing an image, the substrate having an initial thickness, including: preparing a substrate comprising paper making fibers and a low density bulking material so as to produce a substrate having a first density; applying a compressive force to the substrate to compress the substrate to a thickness less than the initial thickness, thereby increasing the density of the substrate to a second density greater than the first density, the compressive force selected to preclude the substrate from returning to the initial thickness after removal of the compressive force; and applying heat to the substrate while applying the compressive force.

One aspect of the invention is based on the discovery that imaged substrate material may be calendered or compressed so as to reduce the thickness of the substrate and thereby increase the density of the substrate. This discovery enables the use of cut-sheet substrates in the formation of books and other bound documents, particularly substrates that are to be employed as pages within a book. This discovery avoids problems that arise in the storage and shipping of bound documents and other materials traditionally shipped to end-users. As a result of the present invention, it is entirely possible to provide a substrate sheet that is of sufficient thickness to feed and be imaged using conventional printing systems, such as xerographic printing systems, and as a result of post-printing compression, produce thinner printed sheets. The advantage of such post-processing is that the weight of the sheets may be reduced along with the thickness, so that shipping costs are reduced.

This aspect is further based on the discovery of techniques that can produce printed pages of varying density, as a function of the compression force applied to the pages during the calendering process. Hence, it is possible, as a result of the present invention, to produce pages that, while using the same substrate stock for input, are able to produce output pages of differing thicknesses/densities. An aspect of the invention can be implemented, for example, by a compression roller system for which the pressure of the compression nip therein may be adjusted.

Figure 1:
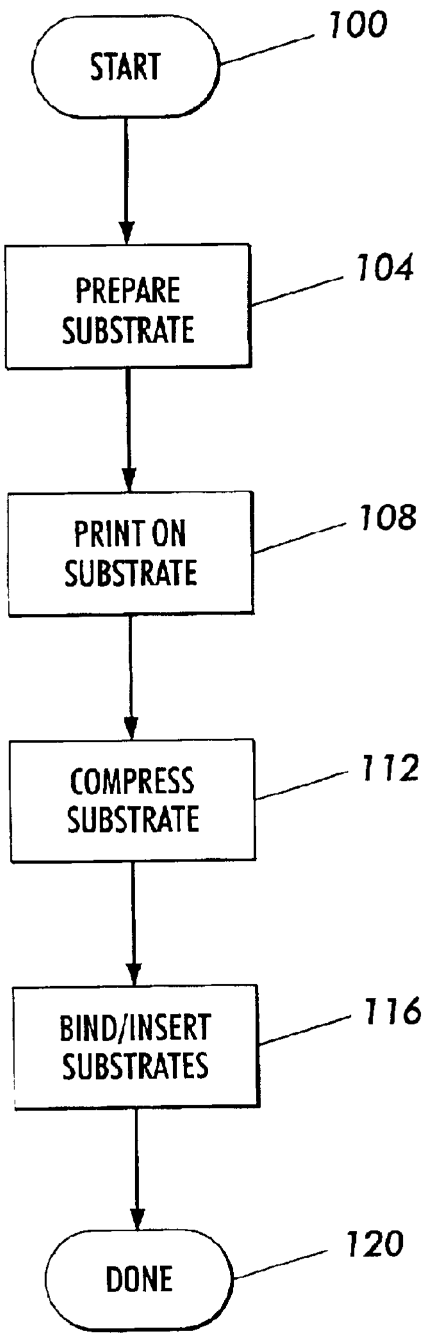
FIG. 1 is a flowchart depicting the general steps in accordance with an aspect of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

As used herein, "substrate" is understood to include any material on which an image may be rendered, printed, created or transferred, including paper, paperboard, laminates, plastic fiber, laminates, urethane, cloth, film, composites or fiberglass, whether sheet fed, roll fed, or otherwise constructed. The substrate has a given or preferred thickness for processing such as imaging and may have any of a variety of widths and lengths depending upon the intended use and the imaging process.

Referring to FIG. 1, depicted therein is a flowchart representing the general process steps contemplated in accordance with an embodiment of the present invention. In particular, step 104 is the initial step of preparing the substrate. The substrate is preferably prepared in a manner known for the production of paper from cellulosic materials such as wood pulp. However, it will also be appreciated that other paper-making processes and/or other components may be employed in the production process. The substrate of the present invention may be prepared in one of two methods. The first method is to utilize a conventional paper-making process (including beating, casting, etc.), but to limit or reduce the pressing operations applied to the pulp to remove water therefrom. Such a modification may result in a "rougher" paper surface, but will also result in a substrate that has larger air voids between the pulp particles therein—thereby increasing the thickness and reducing the density of the substrate.

A second method of producing substrate sheets that are susceptible to compression is to produce the substrates having additional materials included in the pulp. Examples include those materials as disclosed by U.S. Pat. No. 3,293,114 where hollow expanded spherical particles are incorporated into the paper pulp by admixture with the wet pulp prior to deposition on the screen or U.S. Pat. No. 3,556,934 which teaches the incorporation of the microspheres in an unexpanded state to the aqueous suspension and during the drying of the paper subjecting it to temperatures sufficient to cause the particles to expand within the paper sheet. U.S. Pat. No. 3,941,634 issued Mar. 2, 1976 discloses a method for the preparation of paper containing plastic particles by forming two-spaced apart dewatered webs of cellulose fibers introducing expandable thermoplastic beads between the dewatered webs pressing the spaced apart partially dewatered webs together and subjecting this product to heat to at least partially dry the fibers and at least expand a portion of the beads. It will be further appreciated that various pulp combinations may also modify the thickness and initial density of the substrates so as to produce paper that is acceptable for traditional cut-sheet printing, yet is easily compressed using compression rollers or equivalent mechanisms.

Having described alternative methods for preparing the substrate in step 104, the next step in the process, step 108, is marking or printing on the substrate. In this step, any of a number of well-known printing technologies may be employed to render marks (toner, ink, etc.) on one or both surfaces of a substrate. It will be appreciated that such system may advantageously operate on cut-sheet substrate that is of conventional thickness, and particularly a thickness sufficient so as to avoid jamming the paper-handling mechanisms in the printers. Subsequent to printing or marking, step 112 represents the compression step wherein the printed substrates are compressed so as to reduce the thickness of the printed substrate.

Once reduced in thickness, the substrates may be further processed as represented by the bind substrates step 116. It will be appreciated however, that in addition or alternative to binding, the compressed substrates may also be folded, cut, trimmed, stapled, etc. so as to render the printed pages into a final form for the recipient or reader.

For example, the process depicted in FIG. 1 may be employed to produce a signature booklet from 11 inch×17 inch paper stock, wherein the individual booklets may be stapled or stitched and incorporated with a cover or additional booklets to form a book or manual. Using the present process, it may be possible to increase the number of pages with in bound document (brochure, booklet, book, etc.) by as much as thirty percent while maintaining the same physical size of the document. Having described the general steps of the process, attention is now turned to details of the compress substrate step 112, and to the equipment for performing such operations.

Figure 2:
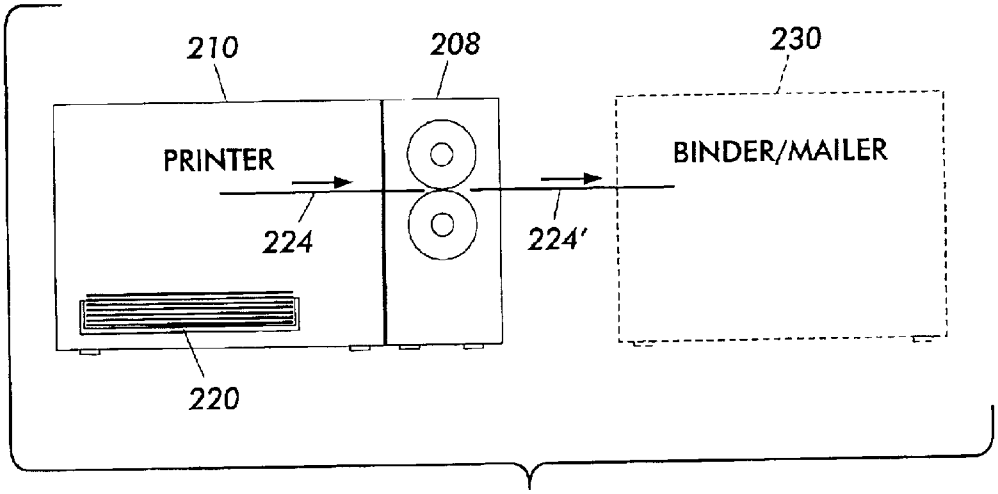
FIG. 2 is a block diagram depicting an embodiment of the present invention.

Referring to FIG. 2, the substrate compression system 208 of the present invention may operate in conjunction with a printer 210 and be located downstream of the printer. That is, the printer 210 takes one or more blank substrate sheets from a supply 220 and then forms an image on the substrate to produce a printed substrate or sheet 224 using well-known methods such as ink-jet printing, thermal printing, xerographic printing, ion-deposition printing, etc. Subsequently, the printed substrate 224 passes to compression system 208.

In one embodiment, the compressed substrate 224', exiting from the compression system 208, may be processed by a binding or other post print processing system 230. Although not specifically depicted in the figure, such systems may include staplers, stitchers, mechanical binders, wire binders, glue binders and other equivalents well-known in the document binding and book-binding trades. The compression station 208 may be cooperatively engaged with current high speed printers having a bypass transport, where printed sheets (substrates) are transferred directly out of the printer into secondary processing equipment. Hence, the compression station may be operably located prior to or within the secondary processing equipment. Alternatively, the compression station may be attached to the printer as an intermediate operation between the printer and subsequent secondary processing equipment.

Figure 3:
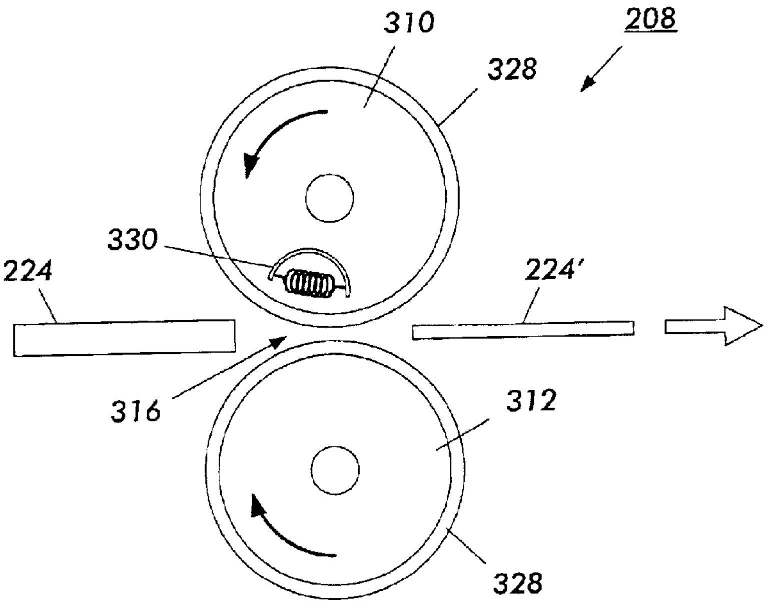
FIG. 3 is a detailed illustration depicting components of an element of FIG. 2.

Referring next to FIG. 3, there is shown a detailed view of an embodiment of the compression station in accordance with the present invention. In particular, station 208 includes a pair of rollers 310 and 312, where the rollers are in general contact with one another at a nip 316. In operation, an uncompressed substrate 224 enters the nip and, due to the interaction of the rollers, is driven through the nip by the rotating rollers. As driven through the nip, substrate 224 is compressed as a result of the compressive forces applied by the rollers and the resulting compressed substrate 224' is reduced in thickness. In one embodiment, the compression nip may be accomplished using a Delphax Imager pressure fusing system. As will be further described with respect to FIG. 7.

Rollers 310 and 312 may be made of a various materials, including aluminum having an anodized outer surface to improve hardness and wear resistance. It will be further appreciated that the rollers should have smooth surfaces absent any machining or grinding marks so as to avoid transferring such marks to the calendered or compressed substrate 224'. It is also contemplated, in accordance with an embodiment of the present invention and as depicted in FIG. 3, that rollers 310 and/or 312 include a resilient or compliant coating or outer layer 328 thereon. Such a surface coating may include a urethane or similar polymerized or rubberized material. It is however, recognized that such materials may also be attractive to particular substrate materials and/or images printed thereon, so that the coating material must be selected so as to be compatible with the substrate and printing ink or toner.

In one embodiment rollers 310 and 312 are approximately four inches in diameter and are operated with a compression force of between 0 and 400 pounds per linear inch along nip 316. It will be appreciated that the compression force is preferably adjustable so as to control the amount of compression of the substrate. It is also apparent that the spacing between the rollers may need to be controlled so as to easily adapt to substrates of initially varying thicknesses. Although not depicted in FIG. 3, it will be appreciated that both rollers 310 and 312 are driven concurrently at a generally uniform speed. Under most conditions, the rollers may be operated with a surface speed of between 10 and 300 feet per minute. The compression of the substrate will be increased at a lower surface speed, however, the application of heat will also affect the preferred roller surface speed. Additionally, it is also contemplated herein that the application of a calendaring force may be accomplished by a series of successive compression nips formed between a plurality of calendar roller pairs. The hardness and surface finish of the rollers is at least partially determined by the anticipated processing volume, the substrate material, the image type and the desired finish to the substrate. The substrates may be compressed to exhibit a glossy, smooth, shiny, antiqued or matte finish. It is anticipated that at least some processing will seek to achieve a resulting finish that closely matches the imaged and uncompressed finish.

Also depicted in FIG. 3 is a radiant or conductive heat device 330 that may be employed to apply heat to the inner surface of a hollow roller 310 and/or 312. The application of heat, in one embodiment of the present invention may significantly aid in the compression of the substrate, particularly for substrates having filler components that are subject to size decreases in response to heat. Although depicted as a radiant heater mounted interior to one of the rolls, it will be appreciated that the heat source 330 may also be directed on an outer surface of the rollers 310 and/or 312. It is further contemplated that alternative heating mechanisms may be employed in the present invention, including resistance heaters, heat pads or blankets and other types that may be used to warm the mass or outer surface of the rollers. It is believed that heated rollers, in a temperature range of 110° F. to 250° F. may be employed to assist in the compression or calendering operation.

The heating device 330 may be any of a variety of heaters including radiant, convective or conductive heat. In yet another alternative embodiment, a separate heating roller may be employed upstream of the compression roller nip to heat the substrate. It is also contemplated that radiant heaters, such as heat lamps, could be used to heat the substrate prior to exerting the compressive force. The substrate may thus be heated above an ambient temperature, and if necessary to a higher temperature that is below a degradation temperature of the substrate.

Figure 4:
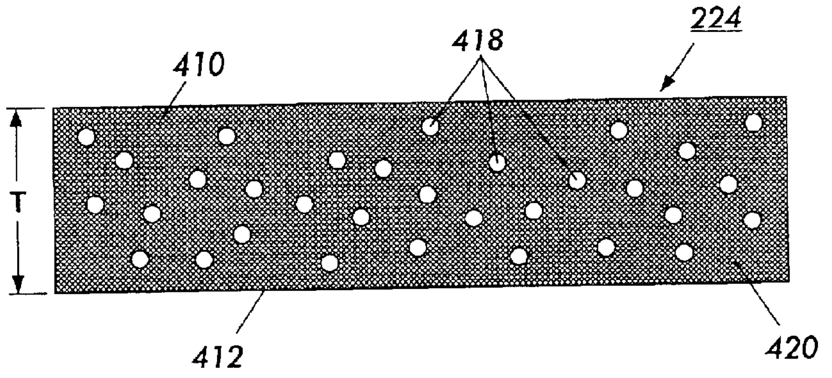
FIGS. 4–6 are illustrations of the compressible substrate in various stages of processing in accordance with the present invention.
Figure 5:
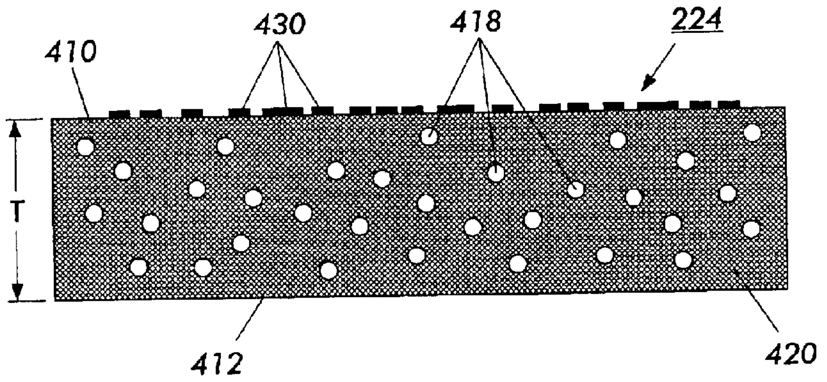
Figure 6:
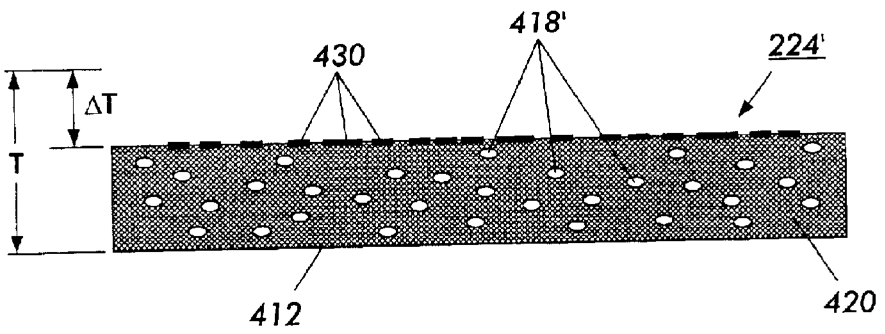

FIGS. 4 through 6 depict a substrate in various states of processing in accordance with the present invention. In particular, in FIG. 4, the substrate 224 is in its pre-printing state, and includes upper imaging surface 410, optional lower imaging surface 412 and a plurality of expanded regions or voids 418 within the substrate matrix 420. It will be appreciated that in accordance with an aspect of the present invention, the voids or collapsible regions may be confined or generally aligned along a layer within substrate matrix 420. As illustrated in FIG. 5, on the substrate imaging surface 410, a toner or similar image or rendering may be deposited during a printing process. In FIGS. 4 and 5, the thickness of substrate 224 is indicated as T.

In FIG. 6, after printing and compression, the substrate 224' is depicted with compressed voids 418' and matrix 420. As indicated along the left side of the figure, the thickness of the substrate has been reduced from the original thickness T by an amount $\Delta T$, so that the amount of compression of the substrate's thickness (C) is equal to $\Delta T/T$. In accordance with the processing parameters set forth above, the compression C is generally in the range of 5% to 50%. Preferably, the compression of the substrate 224 from the pre-imaging state of FIG. 4 to the compressed state of FIG. 6 is a one-way process without secondary processing. In other words, the substrate does not substantially migrate or creep back towards the thickness of the imaging state.

It will also be recognized by those familiar with printing systems that the substrate should have a threshold compression pressure sufficient to permit the desired printing or imaging on the substrate without reducing its volume or transforming the substrate to the compressed state. That is, in the imaging state the substrate 224 has structural and performance characteristics sufficient to permit imaging through simplex or duplex printing operations including copiers, printers, facsimiles or the like. The structural characteristics of the substrate 224 in the imaging state are selected to permit the substrate to be used interchangeably with traditional substrates, such as paper. Preferably, the substrate 224 can be compressed without changing the image 430 thereon. That is, the substrate 224 does not significantly distort, warp, or curl upon compression, and hence any image on the substrate 224' is not degraded.

As represented in FIG. 4–6, substrate 224 may be formed of a variety of constructions such as a multiplicity of collapsible voids 418. The voids 418 may be formed by microstructures embedded in the substrate, as well as voids in the material of the substrate itself produced through processing techniques as noted above. The voids 418 may be formed by dispersing a multiplicity of micro capsules or spheres throughout the substrate during manufacture. Thus deformable embedded structures are located throughout the substrate and upon application of the compressive force, the structures are sufficiently ruptured or collapsed to substantially preclude return to the pre-compression state. Alternatively, the substrate may include spaces or voids sandwiched between layers.

Other possible methods of constructing such substrates as laminates having a micro-thin layer of Styrofoam® (or other highly compressible material) between two very thin layers of paper. The laminate has a sufficiently high tensile strength in the imaging state to permit use in imaging processes, yet yields to the compressive force to substantially reduce the thickness without distorting or degrading the image. A further construction of the substrate 224 contemplates the inclusion of a multiplicity of fibrous or puffy particles. Alternatively, the substrate 224 may include a corrugated layer embedded within the substrate matrix 420 that is irreversibly compacted upon exposure to a suitable compression force. However, any such compressible, collapsible paper will work well with this method.

In the preferred embodiment, the entire surface of the substrate is exposed to the compressive force. However, it will be appreciated that there may be particular situations where regions of the substrate are required to remain uncompressed. When rollers are used in the compressing process, fuser oil or toner residue may build up on these rollers. If so, a rubber squeegee, blade or knife may be used to remove or reduce accumulated oil or toner.

Figure 7:
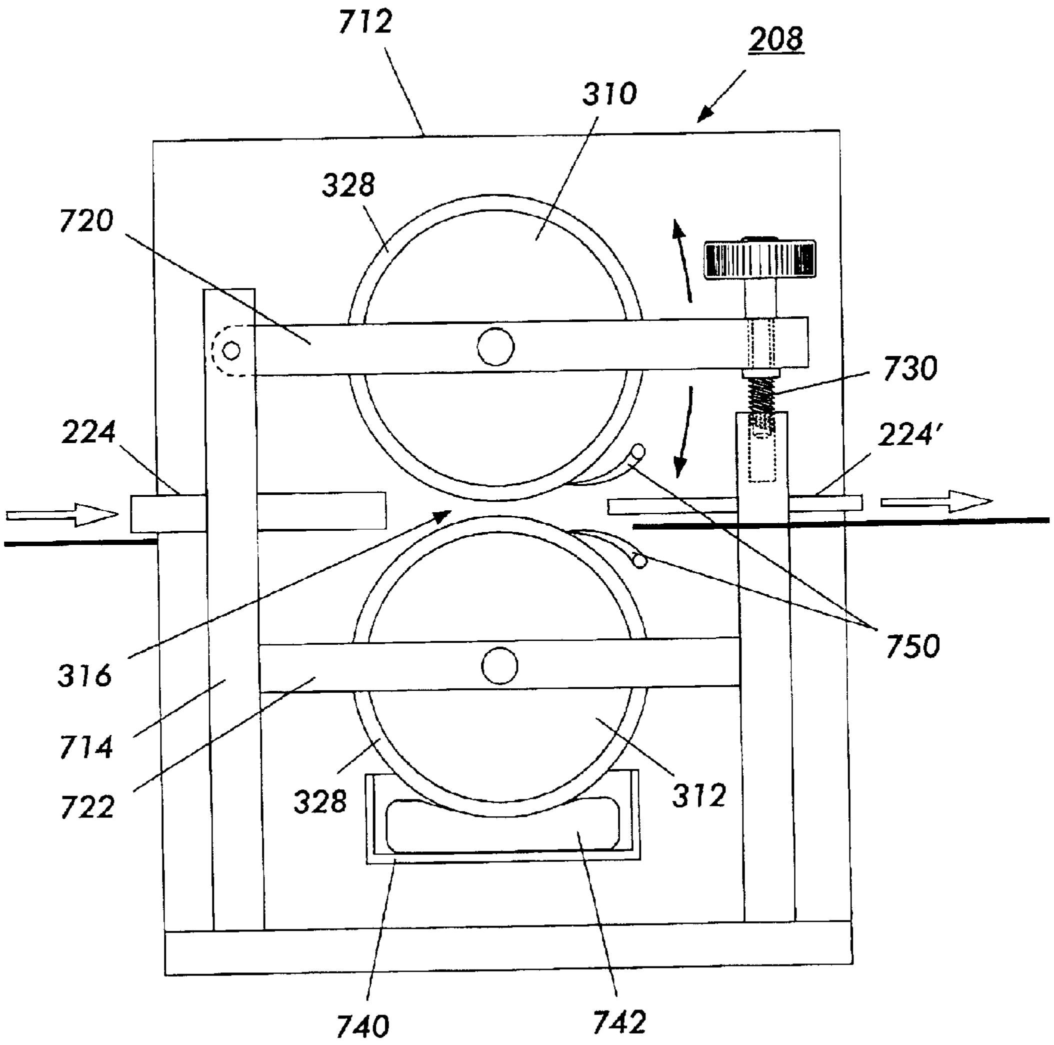
FIG. 7 is a representation of a compression station in accordance with one embodiment of the present invention.

Turning now to FIG. 7, depicted therein is a representation of a compression station in accordance with one embodiment of the present invention. In addition to the previously described compression rollers 310 and 312, the station further includes a housing 712 having a roller support frame 714 therein. Frame 714 includes at least two roller support members 720 and 722 that are pivotably adjustable relative to one another. For example, as illustrated in the figure, the location of roller 310 may be adjusted up or down by the movement of an adjustable screw 730. Adjustment of screw 730, therefore, controls the gap or interference between rollers 310 and 312. As the gap is eliminated and the screw continues to be tightened, it is possible to increase the pressure along the compression nip 316. In this fashion, it is possible to control the compression force applied along the nip, and to thereby control the amount of compression force that the substrate is subjected to.

As described above, in some instances, due to the nature of the printing techniques and substrate, it may be necessary to provide a cleaner for the rollers, or it may be necessary to coat the rollers with a release agent. Cleaning/coating station 740 is intended to represent a devices suitable for accomplishing one or both of those functions, where a web or brush 742 may be used to remove debris or apply a cleaning or release agent to the roller. It will be appreciated that a similar station may be provided to upper roller 310 as well, but that such a station should be mounted so as to be movable with respect to the pivotable roller. As will be appreciated, the rollers may also have associated doctor blades (not shown) for cleaning the surfaces of any accumulated debris or substrate particles.

Also depicted in FIG. 7 are a pair of stripper fingers 750, which are preferably spring-loaded or biased into contact with the roller surface. Such fingers, well-know in the xerographic fusing technologies, are employed to assure that the compressed substrate does not remain attached to one of the rollers as it exists the compression nip 316. It is believed that a single finger on each roller may be sufficient, however, it is also contemplated that a plurality of fingers may extend over the length of the roller surface.

In recapitulation, the present invention is a method and an apparatus for controlling the volume of a printable substrate after an image is created thereon. The method and system do so via the application of a controllable compressive force via a compression nip between two compression rollers.

It is, therefore, apparent that there has been provided, in accordance with the present invention, a method and apparatus for controlling the volume of a printable substrate. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for reducing a thickness of a compressible substrate bearing an image, the substrate having an initial thickness, comprising:

applying a compressive force to the substrate to compress the entire substrate to a thickness less than the initial thickness, the compressive force selected to preclude the substrate returning to the initial thickness after removal of the compressive force therefrom; and concurrently applying heat to the substrate.

2. The method of claim 1, wherein the compressive force is adjustable so as to achieve a desired thickness for the substrate after compression.

3. The method of claim 1, wherein the compressive force is applied by passing the substrate through a roller nip formed between two adjacent rollers, and where the concurrent application of heat is accomplished by heating at least one of the rollers.

4. The method of claim 1, wherein the pressure applied to the substrate as it passes through the nip is in the range of 0 to 400 pounds per linear inch.

5. The method of claim 1, wherein the recited steps are repeatedly applied to a plurality of substrate sheets which are further processed to form a bound document consisting essentially of reduced thickness pages.

6. The method of claim 1, wherein the compressive force is applied by passing the substrate through a roller nip formed between two adjacent rollers, and where the compressive force is adjustable by adjusting a nip pressure so as to produce a compressed substrate having a thickness in the range of 99% to 50% that of the initial thickness.

7. A method for reducing a thickness of a substrate bearing an image, comprising:

forming an image on a substrate, the substrate transformable from an imaging state having a first thickness to a compressed state having a second thickness thinner than the first thickness over the entire substrate; and concurrently compressing and heating the imaged substrate to transform the entire substrate to the compressed state without substantially distorting the image.

8. The method of claim 7, wherein the image is produced on the substrate using a toner deposition process, and wherein the step of concurrently compressing and heating the imaged substrate causes the toner image to smoothen and produces an improved glossy image quality.

9. The method of claim 8, further including the step of applying a release agent to a surface that contacts the image during the compressing and heating step so as to prevent the image from transferring to the surface.

10. An apparatus for producing a compressed substrate having an image thereon, comprising:

an imaging station for rendering an image onto the substrate when said substrate is in an uncompressed state; and a compressing station, operatively associated with the imaging station, to receive an uncompressed substrate with an image thereon and to apply a sufficient compressive force to the imaged substrate to permanently reduce a thickness of the entire substrate and thereby produce a compressed substrate with an image thereon.

11. The apparatus of claim 10, wherein the compressing station includes at least two rollers forming a nip therebetween, and where the uncompressed substrate may be fed into the nip as the rollers are rotated so as to concurrently feed the substrate therethrough while compressing the substrate.

12. The apparatus of claim 11, wherein the compressive force applied to the substrate as it passes through the nip is in the range of 0 to 400 pounds per linear inch.

13. The apparatus of claim 11, wherein at least one of said rollers includes a resilient outer surface so as to compensate for any unevenness in the rollers.

14. The apparatus of claim 11, wherein at least one roll is formed from aluminum and an outer surface thereof is anodized.

15. The apparatus of claim 14, wherein the at least one roll further includes a urethane coating applied over the outer surface thereof.

16. The apparatus of claim 11, further comprising at least one stripper finger to assist with the removal of the substrate from the roller surface after the substrate passes through the nip.

17. A method for reducing a thickness of a compressible substrate bearing an image, the substrate having an initial thickness, including:

preparing a substrate comprising paper making fibers and a low density bulking material so as to produce a substrate having a first density; and applying a compressive force to the entire substrate to compress the substrate to a thickness less than the initial thickness, thereby increasing the density of the substrate to a second density greater than the first density, the compressive force selected to preclude the substrate from returning to the initial thickness after removal of the compressive force.

18. The method of claim 17, wherein the low density bulking material is compressible.

19. The method of claim 17, wherein the low density bulking material includes a structure that is collapsible so as to increase its density.

20. The method of claim 17, wherein the low density bulking material is a corrugated layer that forms part of the substrate matrix.

21. A method for reducing a thickness of a compressible substrate bearing an image, the substrate having an initial thickness, comprising the steps of:

applying a compressive force to the substrate to compress the entire substrate to a thickness less than the initial thickness; and removing the compressive force;

wherein the compressive force is selected to be of a magnitude sufficient so as to cause a permanent reduction in the thickness of the entire substrate and to preclude the substrate returning to the initial thickness after removal of the compressive force therefrom.

22. The method of claim 17, further comprising the step of applying heat to the substrate in association with the compressive force.

* * * * *